United States Patent

[11] 3,604,956

| [72] | Inventor | Walter A. Cooke<br>Sunnyvale, Calif. |
|---|---|---|
| [21] | Appl. No. | 838,168 |
| [22] | Filed | July 1, 1969 |
| [45] | Patented | Sept. 14, 1971 |
| [73] | Assignee | The United States of America as represented by the Secretary of the Navy |

[54] RADIATION IMMUNE TIMING CIRCUIT
8 Claims, 5 Drawing Figs.

[52] U.S. Cl.................................................. 307/293,
307/202, 307/246, 307/304, 307/308, 307/322
[51] Int. Cl........................................................ H03k 17/28
[50] Field of Search............................................ 307/202,
246, 293, 294, 304, 322, 308

[56] References Cited
UNITED STATES PATENTS
3,119,027  1/1964  Faust............................ 307/293

3,343,006  9/1967  Attwood........................ 307/293 X
3,473,054  10/1969  Wieczorek.................... 307/304 X Primary Examiner—Donald D. Forrer
Assistant Examiner—R. C. Woodbridge
Attorneys—R. S. Sciascia and J. A. Cooke ABSTRACT: An interval-timing circuit which remains accurate after being subjected to a transient radiation impulse. The circuit includes a bucket and ladle integrating network for converting digital timing pulses to an analog voltage signal. The analog voltage signal is converted to a current signal by an isolation circuit and is then passed to a current level detector which generates an output when the current signal reaches a predetermined magnitude. A dynamic resetting circuit is coupled to the current level detector to prevent the generation of a premature response due to false activation of the level detector by a transient radiation impulse.

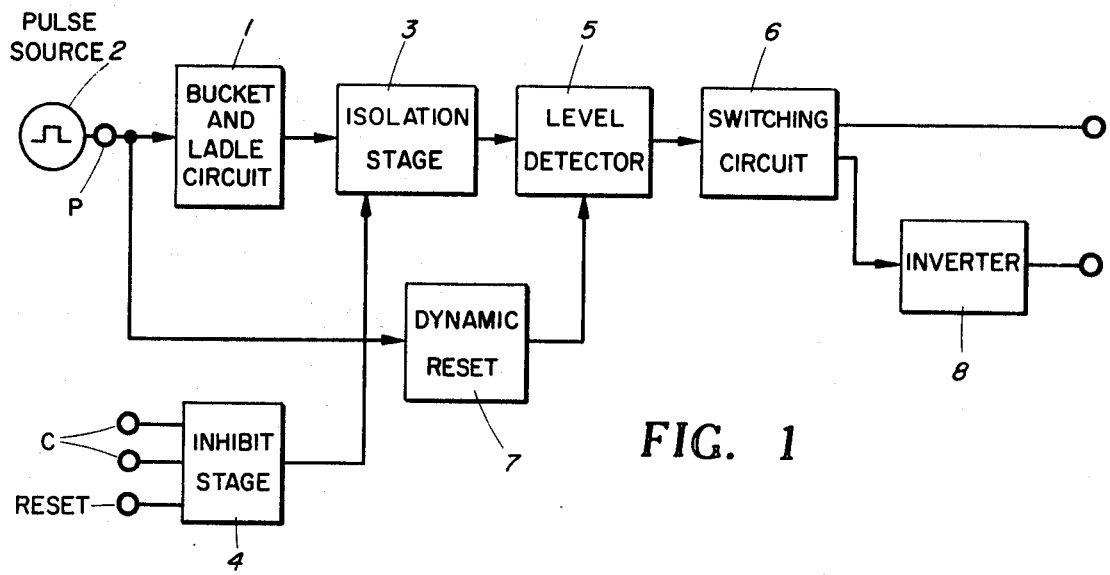
FIG. 1
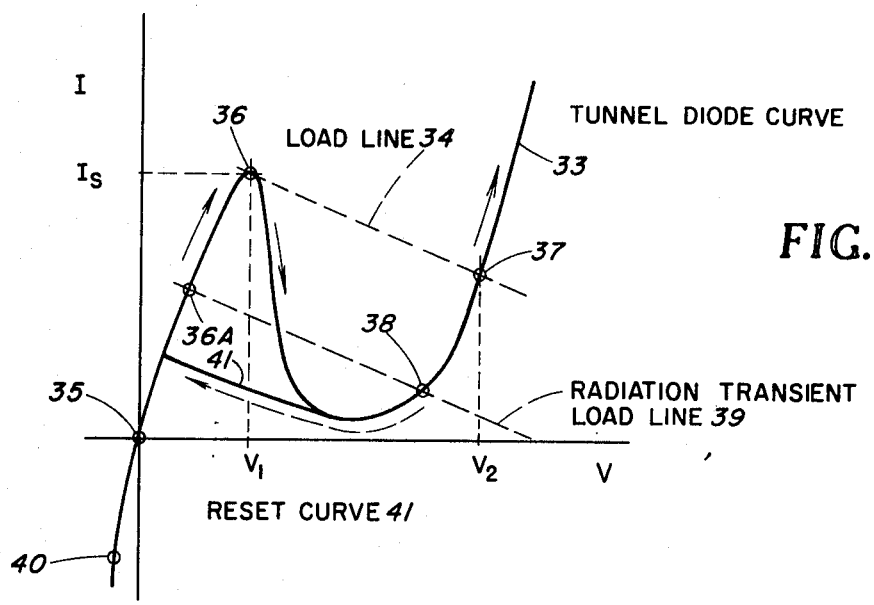
FIG. 3
| Fig. 2a | Fig. 2b |
FIG. 4
Walter A. Cooke
INVENTOR

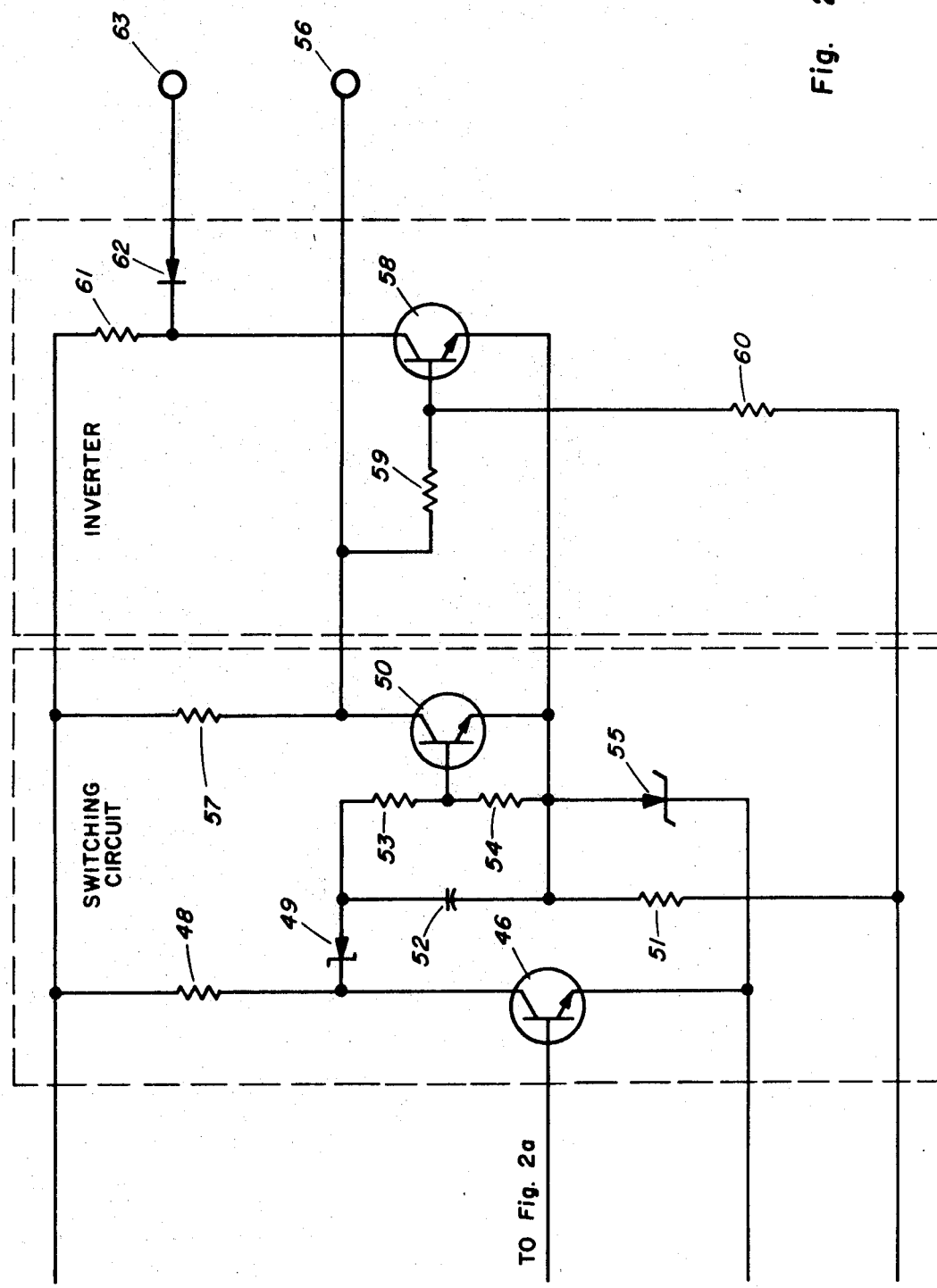

3,604,956

RADIATION IMMUNE TIMING CIRCUIT

BACKGROUND OF THE INVENTION

This invention relates generally to timing circuitry and more particularly to an interval timing circuit having a high reliability under the influence of severe environmental transients.

It is often important in controlling the operation of a vehicle, such as a rocket or missile that a critical event be inaugurated a fixed period of time after the vehicle is started or launched. Under ordinary environmental circumstances, a wide variety of present day timers would be sufficiently accurate and reliable to satisfactorily accomplish such a task. However, many such timers do not perform well in those situations where the associated vehicles are launched under unfavorable environmental conditions such as those which include a transient radiation in pulse, created for example, by a nuclear detonation.

Generally, the environmental radiation transient created by such a detonation is an impulse of relatively short duration consisting of intense intermixed thermal, electromagnetic, gamma and neutron radiation. Such radiation may be of sufficient intensity to completely destroy electronic components subjected to it, in which case even the most ingeniously designed circuits are rendered ineffective. However in many instances, the radiation is either insufficient to permanently disable electronic components, or its influence on circuit components is reduced to a level below that which would cause permanent damage by shielding techniques.

Although circuit components are not permanently damaged by such radiation, they are generally caused to malfunction momentarily. The malfunctioning is most serious in the operation of active components, such as transistors and diodes, since these elements are often short-circuited by the influence of the radiation impulse. Short circuiting of active components cannot be prevented by practical shielding techniques, because shielding, while it does attenuate the electromagnetic and thermal components of the radiation impulse, does not prevent the gamma and neutron components of the radiation from reaching the shielded circuit. Consequently, a circuit that is to perform properly in the presence of such a radiation transient must be capable of continuing operation accurately even though its principal active components may be occasionally short-circuited for a brief interval. Existing timing circuits are generally incapable of continuing operation accurately under such circumstances because the short circuiting of their active elements causes such timers to reset, or to lose track of the time interval that has elapsed before the short circuiting occurs. In addition, many interval timers presently available generate false output pulses upon the occurrence of a radiation transient thereby becoming highly unreliable.

SUMMARY OF THE INVENTION

Accordingly, one object of this invention is to provide a new and improved timing network capable of accurate and reliable operation in the presence of radiation transients.

Another object of this invention is the provision of an analog timing network that remains accurate even though its principal electronic components may be periodically briefly short-circuited.

A further object of this invention is to provide an analog fixed interval timer that remains accurate and reliable under extremely adverse environmental conditions.

Another object of the invention is to provide a novel capacitive integrating circuit.

Briefly these and other objects of the invention are achieved by providing an integrating circuit which develops an analog voltage representative of a series of timed digital input pulses. The voltage signal is converted to a current signal by an isolation and converting stage, and is then applied to a current level detector which generates an output when the current signal reaches a predetermined magnitude. A dynamic resetting circuit is provided to reset the current level detector as each timing pulse is received to prevent the level detector from generating a premature response in the event that it has been subjected to a radiation impulse. The output of the level detector activates an output switching circuit which generates an output voltage after a selectable timing interval has elapsed.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

FIG. 1 is a block diagram of the invention;

FIGS. 2a and 2b together are a schematic diagram representing the circuit of the preferred embodiment; and, FIG. 3 is a graphical illustration of a characteristic operating curve for a tunnel diode.

DESCRIPTION OF THE PREFERRED EMBODIMENT

Figure 2A:
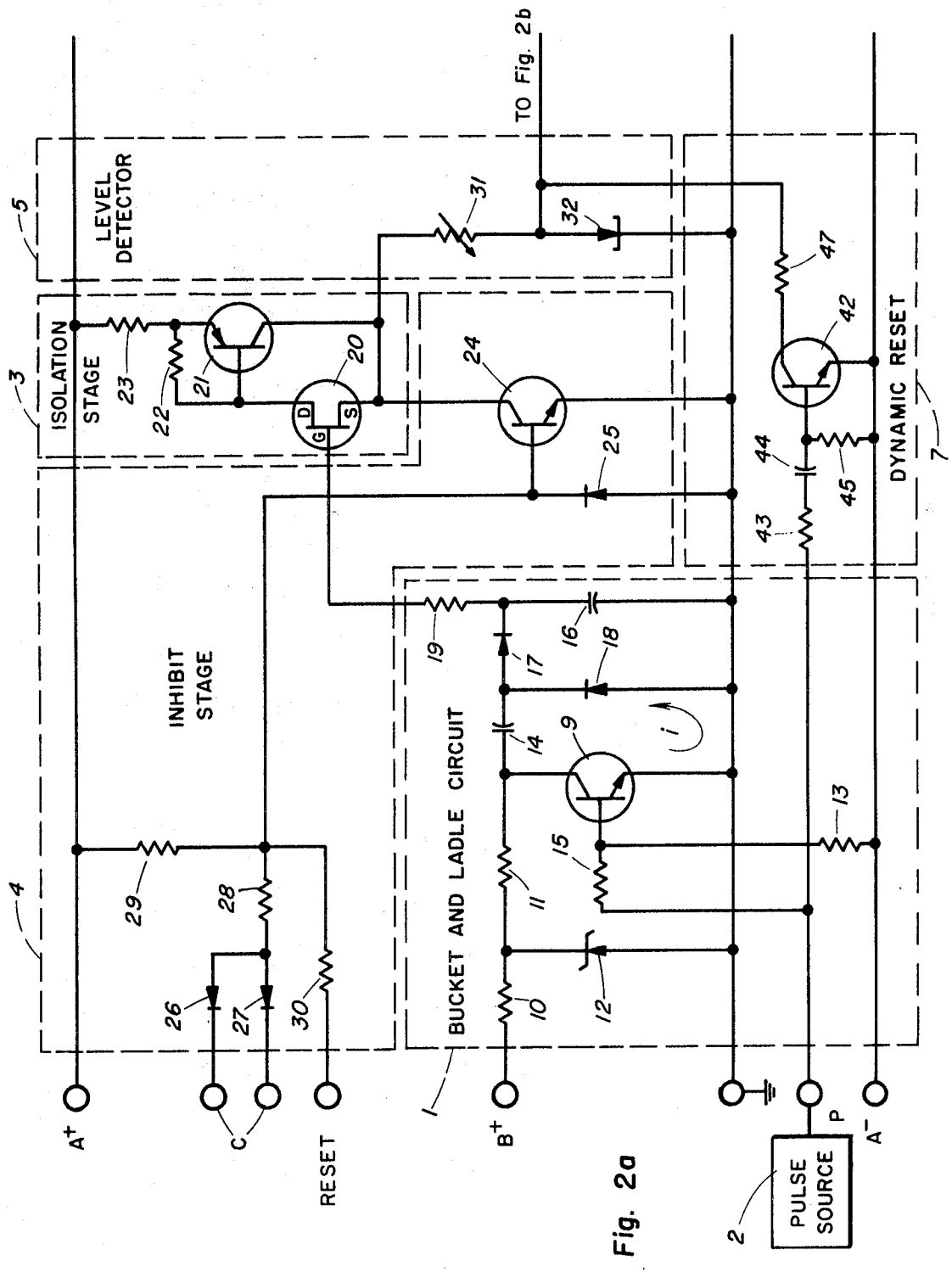

Referring now to the drawings wherein like reference characters designate identical or corresponding parts throughout the several views, and more particularly to FIG. 1 wherein the overall arrangement of the various functional stages of the instant invention is shown as including an integrator stage such as a bucket and ladle circuit 1 which develops an output analog signal proportionate to the number of pulses applied to input terminal P from a constant rate pulse source 2 which may be a part of the electronic system of the vehicle which the instant invention is associated. The output of the bucket and ladle integrator stage 1 is applied to an isolation stage 3 characterized by an extremely high input impedance to prevent loading of the bucket and ladle circuit by the rest of the circuit. An inhibit stage 4, controllable by one or more of a plurality of signals from external sources applied to input terminals C and RESET, selectively permits or prevents the isolation stage 3 from passing the bucket and ladle signal to a level detector 5. The inhibit stage 4 may be used to turn the timer on or off automatically in response to the detection of an event or a plurality of events as well as to provide a manually operated timing reset control. The level detector 5 triggers an output switching circuit 6 when the bucket and ladle output voltage reaches a magnitude representing the passage of a desired interval of time. The level detector 5 is reset by each input pulse from source 2 via a dynamic reset circuit 7 to reduce the effects of an environmental transient thereon. The need for continually resetting the level detector circuit will become more apparent as the particular components of the level detector are described thereinafter. The output of switching circuit 6 may be passed through an inverter stage 8, where necessary, to make the output signal compatible with the needs of subsequent circuitry.

As more clearly shown in FIGS. 2a and 2b, the bucket and ladle circuit 1, the primary time measuring component of the overall circuit network, includes a transistor 9, which operates as a switch. The collector of transistor 9 is connected to a terminal B+ providing a positive unidirectional voltage through interconnected biasing and load resistors 10 and 11, respectively while the emitter thereof is connected to ground. A Zener diode 12 is connected to the juncture of resistors 10 and 11 at its cathode and to ground at its anode to fix the bias voltage of the transistor 9. An additional biasing resistor 13 is connected between the base of transistor 9 and a negative unidirectional voltage source at terminal A− for the purpose of maintaining transistor 9 in a normally conductive state and thereby normally preventing the charging of a capacitor 14 by providing a low-impedance path for the B+ supply. Transistor 9 is periodically switched to its nonconductive state by pulses from source 2 applied to input terminal P which is connected to the base of the transistor through a coupling resistor 15. Pulse source 2 may be any appropriate conventional clock pulse source, such as may be found in the guidance computer of a missile.

When transistor 9 is rendered nonconductive by the receipt of a pulse from source 2, capacitor 14 is charged by current from the unidirectional source connected to terminal B+. The same current changes a capacitor 16 connected through a diode 17 to capacitor 14. In the art, capacitor 14 is conventionally called the ladle capacitor and capacitor 16 the bucket capacitor When the pulse from source 2 terminates, transistor 9 is returned to its conductive state, with the result that ladle capacitor 14 discharges in the direction shown by $i$, through transistor 9 and a diode 18 connected between ground and the juncture of capacitor 14 and diode 17. Bucket capacitor 16 is prevented from discharging through transistor 9 by the blocking effect of diode 17, and is prevented from discharging through isolation stage 3 by the combined effects of current-limiting resistor 19 and the high input impedance of isolation stage 3. Each input pulse from source 2 causes the above described cycle to be repeated with the result that an additional increment of charge is stored on bucket capacitor 16 by the pumping action of the ladle capacitor 14. Since the charge stored on bucket capacitor 16 is, therefore, proportional to the number of timed pulses received from source 2, the output voltage of the bucket capacitor is an analog signal representing the time that has elapsed since the first pulse was applied to input terminal P.

The accuracy of the bucket and ladle timer is not seriously affected by the occurrence of a radiation transient, even through transistor 9 may be caused to short-circuit causing an additional pulse to be counted and stored on capacitor 16 because, any timing error caused by the storage of an additional pulse is normally negligible if the frequency of the applied input pulses is suitably high and the time interval to be measured is relatively long, as they normally are.

In addition, bucket capacitor 16 and ladle capacitor 14 may loose some of the charge stored on each due to the ionizing effect of impinging radiation. Such losses, especially from capacitor 16 could cause significant timing errors, since capacitor 16 is the primary memory element of the overall circuit. To minimize such losses, ceramic capacitors can be used, since they are relatively insensitive to the various types of radiation likely to impinge upon them.

The analog voltage signal developed by the bucket and ladle stage 1, is applied through a current-limiting resistor 19 to the gate electrode of a field effect transistor (FET) 20 arranged in a source follower configuration, in isolation stage 3. The FET which has an extremely high input impedance, detects the output voltage of the bucket and ladle stage 2, but prevents that stage from being loaded by subsequent circuitry. The voltage applied to the gate of the FET controls the source to drain current thereof, thus effectively converting the analog voltage signal of the bucket and ladle stage to a current signal. Since the current gain of FET 20, is normally low, a transistor 21 is connected to the FET in a feedback configuration to amplify its transconductance. The collector and base of transistor 21 are connected to the source and drain, respectively, of FET 20, while the emitter of transistor 21 is connected to a low positive voltage terminal A+ through a current limiting resistor 23. A biasing resistor 22 is connected between the base and collector.

The inhibit stage 4 controls the operation of the overall timing circuit by selectively grounding the output of isolation stage 3 by switching a transistor 24 from its normally nonconductive state to its conductive state. Transistor 24 is normally biased to its nonconductive state by current flowing through a diode 25 connected between the base and emitter electrodes thereof in response to the application of negative control voltages at input terminals C. Input terminals C are connected to diodes 26 and 27 arranged in AND gate configuration, and connected through dropping resistors 28 and 29 to the A+ terminal. The juncture of resistors 28 and 29 is connected to the base of transistor 24. The AND configuration necessitates the simultaneous presence of two positive signals at input terminals C to switch transistor 24 to its conductive state. The signals applied at input terminals C may be generated by the occurrence of specified events which indicate that starting of the timing interval is desirable. Although only two terminals C are shown, it is apparent that any number of inputs may be used to control the starting of the timer.

A third input terminal, labeled RESET, is connected through a coupling resistor 30 to the juncture of resistors 28 and 29 to provide an override control to reset the timer circuit event through it may have been set into its operative condition by the application of appropriate signals at input terminals C. A reset signal applied at the RESET terminal, or an index (inhibit) signal applied at terminals C switches transistor 24 from its normally nonconductive state to its conductive state, effectively connecting the source electrode of FET 20 to ground, thereby producing a twofold effect. Firstly, bucket capacitor 16 is permitted to discharge through current limiting resistor 19 and the internal gate-to-source diode of FET 20, thus resetting the bucket and ladle timing circuit. Secondly, the output signal of isolation stage 3 is shunted to ground before it reaches level detector 5 thereby preventing the level detector from generating an output switching signal.

Current-limiting resistor 19 in conjunction with bucket capacitor 16 establishes a time delay, reducing the amount of charge lost through isolation stage 3 and transistor 24 should that stage and element, respectively, become short-circuited during the passing of the radiation transient. Since the extra pulse counted because of the short circuiting of transistor 9 will tend to cancel the effect of the current lost from capacitor 16 by discharging through isolation stage 3, the net timing error caused by the passing of an environmental transient is extremely small.

Under ordinary operating conditions transistor 24 is not conducting, and the output current signal from isolation stage 3, representing the voltage stored on bucket capacitor 16, is fed through a variable resistor 31 to a tunnel diode 32 of the level detect or circuit 5 which is connected in current-detecting configuration. The tunnel diode operating characteristic shown in FIG. 3 is such that the voltage across it is low if the current through it is below a threshold level, but when the current reaches the threshold level the voltage across the diode jumps rapidly to a much higher magnitude. Thus, the diode acts as a switch producing an output voltage when the current through it reaches a fixed level. The current through the diode is regulated by variable resistor 31, thereby providing an adjustment for setting the time at which the timing circuit generates an output. Resistor 31 accomplishes this adjustment by varying the current flowing through isolation stage 3 for any given voltage on bucket capacitor 16.

Because of the likelihood of the tunnel diode being switched on by a current surge caused by the passing of a radiation transient, the dynamic reset circuit 7 is included to reset the tunnel diode as each incoming pulse is applied to input terminal P. To facilitate understanding of the need for the dynamic resetting circuit, reference is made to FIG. 3 which shows a typical tunnel diode curve 33 and a typical load line 34. Under normal operating conditions, diode operation is represented by curve 33 between points 35 and 36. When the current through the diode reaches the switching value, $I_s$, the diode behavior follows the load line from points 36 to 37, and the voltage across the diode jumps from $V_1$ to $V_2$. However, if a radiation transient occurs when the diode is operating at a point 36a (representing a current less than the switching current and a time premature to the desired output time) the diode is likely to be switched to point 38 along the radiation transient load line 39. If the diode is not reset after being switched to point 38, its operating characteristic will move along curve 33 from point 38 to point 37, reaching the output switching voltage $V_2$ at a current less than the switching current $I_s$, and consequently will produce a switching output at a premature time. To prevent such a false output, the dynamic reset stage 7 reverse biases tunnel diode 32 as each input pulse is received, transferring the operating point of the diode along curve 41 to a point 40 where the voltage across the diode is again a single-valued function of the current through it.

Dynamic reset circuit 7 includes a transistor 42 normally biased to its nonconductive state by a resistor 45 connected between the transistor base and emitter electrodes. The emitter is connected to a low negative potential terminal A−. Transistor 42 is switched to its conductive state by pulses from source 2 applied to the base of the transistor through a coupling resistor 43 and a coupling capacitor 44. When rendered conductive, transistor 42 applied a large negative voltage to the anode of tunnel diode 32 and to the base of a transistor 46 of switching circuit 6 through a current-limiting resistor 47, returning the tunnel diode to its low-voltage (unswitched) state, and switching transistor 46 to its nonconductive state. A radiation transient of sufficient intensity to switch tunnel diode 32 will also render transistor 42 conductive, so that the resetting effect of transistor 42 will be brought into action automatically to counteract the influence of the radiation on diode 32.

The output of tunnel diode 32 is connected to the base electrode of normally nonconductive transistor 46 to render it conductive when the tunnel diode switches. The emitter of transistor 46 is connected to ground and its collector is connected to the A+ terminal through a current limiting resistor 48, as well as to the cathode of a Zener diode 49, which establishes a suitable reference voltage for the biasing circuitry of a transistor 50. The biasing circuitry of transistor 50 includes a resistor 51 connected to the A− terminal at one end and at the other to the junction of a capacitor 52 and a voltage divider comprising interconnected resistors 53 and 54. Capacitor 52 is connected in parallel across resistors 53 and 54 to create a time delay long enough to prevent normally conductive transistor 50 from being switched to its nonconductive state in the event that tunnel diode 32 and transistor 46 are switched on briefly by a radiation transient. The base of transistor 50, connected between resistors 53 and 54 causes the transistor to be switched to its nonconductive condition at the termination of the time delay period established by capacitor 52 and resistors 53 and 54. The emitter of transistor 50 is connected to one side of a Zener diode 55, (the other side of which is connected to ground) to establish a reference voltage level which will appear at an output terminal 56 when transistor 50 is in its normally conductive state. The collector of transistor 50 is connected to one side of a current-limiting resistor 57, the other side of which is connected to terminal A+ and to output terminal 56.

It is to be noted that the switching logic of the transistors 46 and 50 of switching circuit 6 is arranged to prevent a radiation transient from generating a spurious output signal. The receipt of a switching signal from level detector 5 causes normally nonconductive transistor 46 to be switched to its conductive state. The switching of transistor 46, in turn, causes transistor 50 to be switched from its normally conductive state to a nonconductive state, with the result that the output signal representing the receipt of the appropriate timing signal from level detector 5 occurs when transistor 50 is switched to its nonconductive state. Thus, the occurrence of a radiation transient does not effect transistor 50 because it is normally in its conductive state. If the radiation transient caused transistor 46 to be switched to its conductive state, transistor 50 will be turned off and an output signal would result, but the radiation transient will also cause transistor 50 to short-circuit with the result that it will be in its normal conductive state and no output signal occurs. Consequently, the switching logic of switching circuit 6 virtually immunizes it from the adverse influence of an radiation transient.

The collector of transistor 50 may be connected to the base electrode of a transistor 58 in the inverter stage 8 through a biasing resistor 59. Another biasing resistor 60 is connected between the base of transistor 58 and the A− terminal for normally biasing transistor 58 to its nonconductive state. The collector of transistor 58 is connected through a current-limiting resistor 61 to the A+ terminal, as well as to normally reverse bias a diode 62 which controls inverter output terminal 63. When transistor 50 is switched to its nonconductive state, transistor 58 is switched to its conductive state with the result that diode 62 is shorted through transistor 58 and resistor 51 to negative voltage source A−. Diode 62 is thereby forward biased and a negative output occurs at terminal 63.

The inverter circuit is an optional addition to the basic timing network for providing an output of negative polarity for purposes of compatibility with processing circuitry where required. The inverter circuitry does not possess the immunity to the effects of an environmental transient as does switching circuit 6. It is therefore not normally used under circumstances in which the network is likely to be subjected to the effects of a radiation transient.

It should be noted further that though many of the transistors may sustain some permanent damage with regard to their operating characteristics, such damage ordinarily will not significantly effect the operation of the overall timing network, because most of the transistors are used primarily to serve only switching functions. Therefore, as long as they retain their ability to function as switches, the overall network will operate satisfactorily.

Obviously, numerous modifications and variations of the present invention are possible in light of the above teachings. It is therefore to be understood that within the scope of the appended claims the invention may be practiced otherwise than as specifically described herein herein.

What is claimed as new and desired to be secured by Letters Patent of the United States is:

1. A radiation immune circuit comprising:
   input means for converting digital input voltage pulses into an analog voltage corresponding to the number of said digital input voltage pulses;
   isolation means coupled to said input means and having a high input impedance for converting said analog voltage to an analog current without affecting the information content thereof;
   level-detecting means coupled to said isolation means for normally receiving said analog current and for generating a first output voltage whenever the received analog current exceeds a selected amplitude, corresponding to the receipt by said input means of a predetermined number of digital input voltage pulses;
   inhibiting means coupled to said isolation means for selectively preventing said analog current from reaching said level detecting means, thereby preventing said level-detecting means from generating said first output voltage;
   resetting means coupled to said level detecting means for preventing said level detecting means from generating said first output voltage when the amplitude of said received analog current is less than said selected amplitude; and
   output means coupled to said level-detecting means for receiving said first output voltage and for generating an output signal in response thereto.

2. The radiation immune circuit of claim 1, wherein said input means includes first and second energy storage means and an electronic switch controlled by said digital input voltage pulses to briefly store increments of energy on said first energy storage means and to subsequently transfer said increments of energy from said first energy storage means to said second energy storage means for relatively long term storage.

3. The radiation immune circuit of claim 1, wherein said isolation means comprises:
   an electronic switch controlled by said input means for passing said analog current in response to said analog voltage; and
   amplifying means coupled in feedback relationship to said electronic switch for amplifying the current gain of said electronic switch.

4. The radiation immune circuit of claim 1, wherein said level-detecting means includes:

a bistable element for generating said first output voltage whenever said received analog current exceeds said selected amplitude; and means for regulating the amplitude of said received analog current.

5. The radiation immune circuit of claim 1 wherein said inhibiting means includes a normally nonconductive electronic switch connected to a plurality of input terminals which are connected in an AND gate configuration whereby said electronic switch is rendered conductive when appropriate signals are applied to said plurality of input terminals.

6. The radiation immune circuit of claim 1 wherein said resetting-means includes electronic switch means alternatively switched from its conductive to its nonconductive state by said digital input voltage pulses whereby a negative resetting potential is applied to said level-detecting means each time said electronic switch means is switched to its conductive state.

7. The radiation immune circuit of claim 1 wherein said output means includes first normally nonconductive electronic switch means and second normally conductive electronic switch means connected to said first switch means and responsive to the condition thereof whereby said second electronic switch means generates said output signal when switched to its nonconductive state.

8. The radiation immune circuit of claim 1 further including means for generating a signal of a reverse polarity to said output signal.